United States Patent [19]

Anthony et al.

[11] 4,039,298

[45] Aug. 2, 1977

[54] ALUMINUM BRAZED COMPOSITE

[75] Inventors: William H. Anthony; James M. Popplewell, both of Guilford; Andrew J. Brock, Cheshire, all of Conn.

[73] Assignee: Swiss Aluminium Ltd., Chippis, Switzerland

[21] Appl. No.: 709,870

[22] Filed: July 29, 1976

[51] Int. Cl.² .............................................. B32B 15/00
[52] U.S. Cl. ...................................... 428/558; 75/143; 75/147; 75/148; 428/567
[58] Field of Search ................. 29/197.5; 75/143, 147, 75/148

[56] References Cited

U.S. PATENT DOCUMENTS

| | | | |
|---|---|---|---|
| 3,290,125 | 12/1966 | Pryor | 29/197.5 |
| 3,811,177 | 5/1974 | Schoer, et al. | 75/148 |
| 3,853,547 | 12/1974 | Singleton, Jr. | 75/147 |
| 3,859,059 | 1/1975 | Anthony, et al. | 29/197.5 |
| 3,898,053 | 8/1975 | Singleton, Jr. | 29/197.5 |

*Primary Examiner*—Arthur J. Steiner
*Attorney, Agent, or Firm*—Robert H. Bachman; Robert A. Dawson

[57] ABSTRACT

Brazed aluminum composite having improved resistance to intergranular corrosion. The core alloy consists essentially of from 1 to 1.5% manganese, from 0.1 to 0.4% chromium, from 0.1 to 0.4% copper, from 0.01 to 0.6% silicon, from 0.01 to 0.7% iron, balance essentially aluminum. The cladding brazing alloy consists essentially of from 4 to 14% silicon, from 0.05 to 0.2% bismuth and the balance essentially aluminum. The brazed alloy composite provides galvanic protection against intergranular corrosion.

6 Claims, 8 Drawing Figures

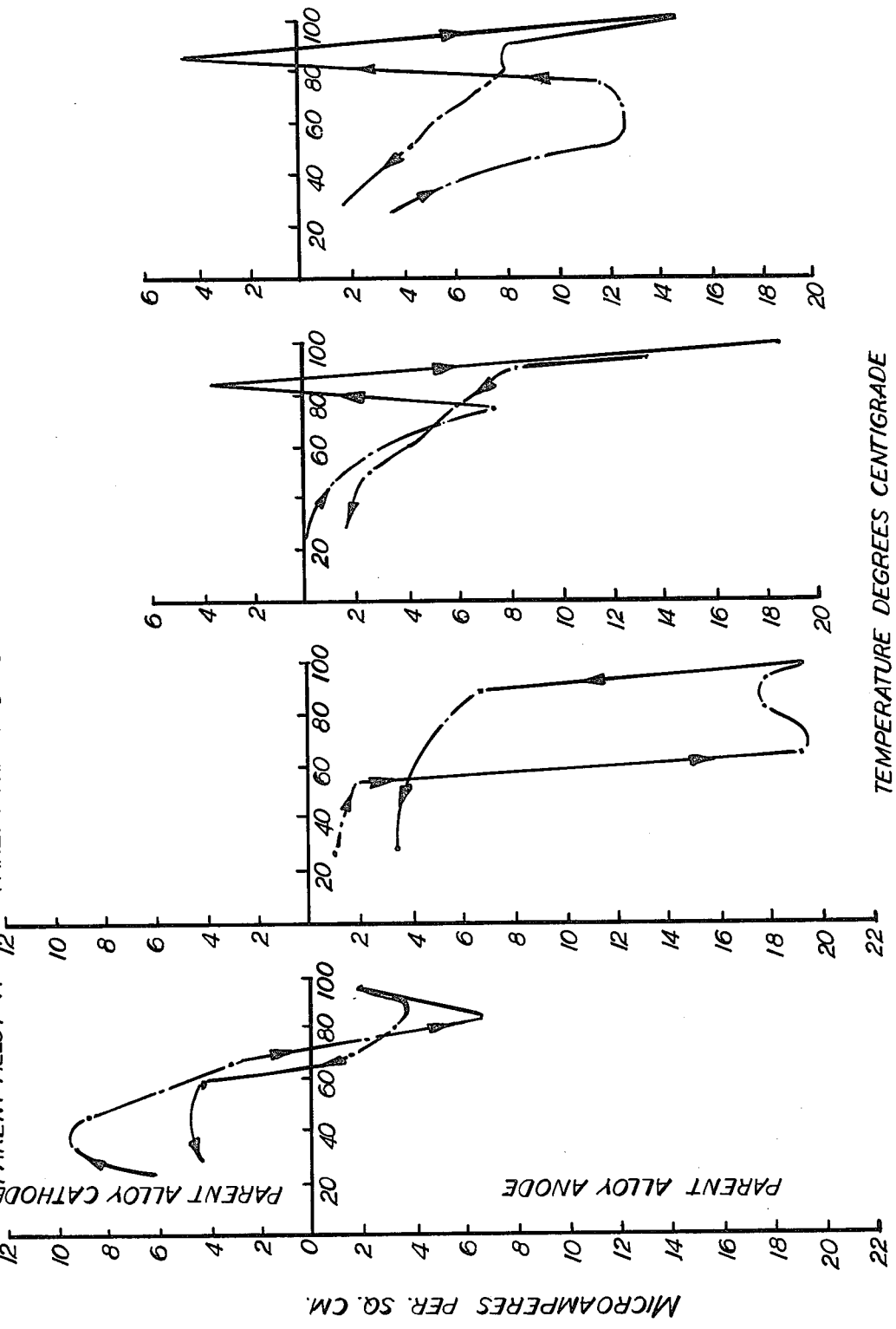

ALUMINUM BRAZED COMPOSITE

BACKGROUND OF THE INVENTION

Brazed aluminum equipment is subject to the severe problem of intergranular corrosion on surfaces coated with the brazing alloy. The corrosive environments which can cause this problem include water containing dissolved chloride, bicarbonate, or sulfate ions, especially if the pH of the water has a relatively low value. Such waters may condense as films on the fins of heat exchanger equipment used for automotive or aircraft air conditions, automotive radiators, gas liquefaction equipment or the like.

Intergranular corrosion has also been encountered in other applications, as on brazed headers inside automotive radiators and heat exchangers generally. In such cases, the coolant is usually corrosive. For example, if automotive antifreeze solutions are used, poor maintenance can often result in the solution becoming corrosive for a variety of reasons. Chief among these reasons are that the antifreeze may have been allowed to remain in the radiator for a number of years without replacement while replenishing the level with mixtures of fresh antifreeze solution or hard natural water. These practices would deplete the corrosion inhibitors and reserve alkalinity components, permitting the coolant pH to drop and allowing heavy metal ions to accumulate from reaction of the acids with copper alloy and cast iron surfaces in the coolant system.

U.S. Pat. Nos. 3,898,053 and 3,853,547 describe certain aluminum-silicon brazing compositions for joining aluminum alloy components; however, these compositions do not solve the problem of intergranular corrosion described hereinabove.

Accordingly, it is a principal object of the present invention to provide an improved brazed aluminum composite which is characterized by substantial resistance to intergranular corrosion.

It is a still further object of the present invention to provide a brazed aluminum composite as aforesaid which is inexpensive and convenient to use on a commercial scale.

Further objects and advantages of the present invention will appear hereinbelow.

SUMMARY OF THE INVENTION

In accordance with the present invention it has been found that the foregoing objects and advantages may be readily obtained. The brazing aluminum composite of the present invention is characterized by improved resistance to intergranular corrosion. The core or parent metal is a substantially magnesium free aluminum base alloy consisting essentially of from 1 to 1.5% manganese, from 0.1 to 0.4% copper, from 0.1 to 0.4% chromium, from 0.01 to 0.6% silicon, from 0.01 to 0.7% iron, and the balance essentially aluminum. The microstructure of the core is characterized by a solid solution containing manganese, copper and chromium, an alpha phase particulate dispersion uniformly dispersed throughout the matrix containing manganese and iron, preferably at substantially comparable concentrations, and particles of $MnAl_6$ uniformly dispersed throughout the matrix. The core or parent material also contains up to 0.5% zinc, up to 0.1% titanium, others up to 0.05% each, total up to 0.15%. The cladding or brazing alloy is an aluminum base alloy consisting essentially of from 0.05 to 0.2% bismuth, from 4 to 14% silicon and the balance essentially aluminum. The cladding preferably contains from 0.5 to 3% magnesium. In addition, the cladding contains up to 0.8% iron, up to 0.5% copper, up to 0.3% manganese, up to 0.1% titanium, others up to 0.05% each, total up to 0.15%.

A particularly surprising feature of the brazed composite of the present invention is that this composite provides galvanic protection against intergranular corrosion.

BRIEF DESCRIPTION OF THE DRAWINGS

The present invention will be more readily understood from a consideration of the following illustrative drawings in which:

FIGS. 5A, 5B, 5C and 5D show the galvanic current flowing in batteries formed by various parent or core alloys and brazing alloys illustrating that in the composite of the present invention the cladding cathodically protects the core in the temperature range of from ambient to 70° C as illustrated in FIG. 5A; whereas, this protection does not characterize the comparative composites.

DETAILED DESCRIPTION OF THE PREFERRED EMBODIMENTS

Figure 1:
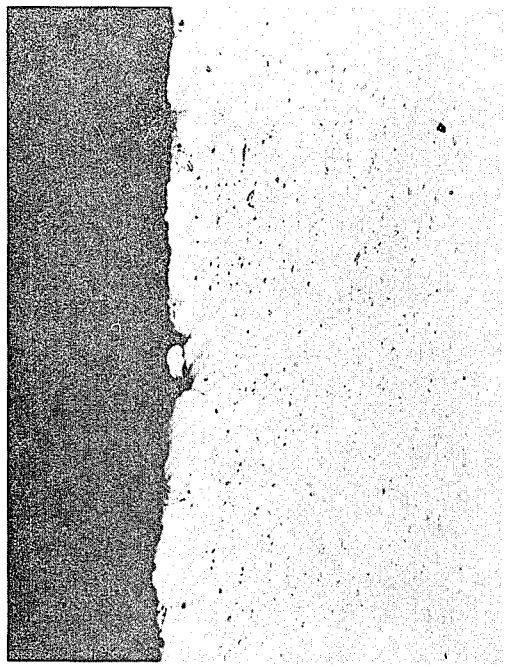
FIGS. 1 through 4 are photomicrographs at a magnification of 200X showing the absence of intergranular corrosion in the composite of FIG. 1 which is the composite of the present invention compared with the presence of intergranular corrosion in the comparative composites of FIGS. 2, 3 and 4.

As described hereinabove, the brazed aluminum composite of the present invention is characterized by improved resistance to intergranular corrosion. The composite of the present inventon provides a surprising degree of galvanic protection against intergranular corrosion and the cladding cathodically protects the core in the temperature range of from ambient to 70° C.

The core or parent material should be substantially magnesium free, that is, the magnesium component can be tolerated as an impurity only up to 0.05% maximum. The presence of magnesium would adversely affect the erosion-corrosion resistance of the material; whereas, the material of the present invention is characterized by good erosion-corrosion resistance. The core or parent material of the present invention is an aluminum base alloy containing from 1 to 1.5% manganese, from 0.1 to 0.4% chromium, from 0.1 to 0.4% copper, from 0.01 to 0.6% silicon, from 0.01 to 0.7% iron, balance essentially aluminum. The microstructure of the core material is significant in obtaining the desired characteristics. Namely, the microstructure defines a predominately solid solution containing alpha phase and containing $MnAl_6$ particles. The solid solution contains predominately manganese, chromium and copper. The microstructure also contains an alpha phase particulate dispersion uniformly dispersed throughout the matrix containing predominately manganese and iron, preferably at substantially comparable concentrations. The alpha phase particulate dispersion also contains relatively small concentrations of silicon and chromium. The microstructure also contains particles of $MnAl_6$ uniformly dispersed throughout the matrix, with said $MnAl_6$ particles being at a lower density than the alpha phase particles. The foregoing microstructure is obtained in accordance with processing of the core material in order to insure that this microstructure shall be obtained.

The core alloy microstructure was attained as a result of applying a particular processing sequence to the foregoing compositions consisting of holding or homogenizing the core for a sufficient period of time at temperature to insure solutionization of the manganese, chromium and copper followed by a slow cooling step which causes the above described alpha phase dispersion to form in which manganese and iron are present in comparable concentrations. The foregoing core alloy microstructure has the optimum corrosion resistance properties because the galvanic driving force between the alpha phase dispersion and the surrounding solid solution matrix is reduced to a minimum. The way this occurs may be seen by a consideration of the thermodynamic electrode potential data for elements present in the core alloy as listed in Table I, below.

TABLE I

THERMODYNAMIC ELECTRODE POTENTIALS OF ELEMENTS IN ACID SOLUTIONS*

| Element | Electrode Potential (Volts) Relative To Standard Hydrogen Electrode | Electrode Potential (Volts) Relative To Aluminum |
|---|---|---|
| Aluminum | −1.662 | |
| Manganese | −1.180 | + .482 |
| Chromium | − .744 | + .918 |
| Iron | − .440 | +1.222 |
| Copper | − .337 | +1.999 |

*Data from "The Encyclopedia of Electrochemistry" Edited by Clifford A. Hampel, Rheinhold Publishing Corporation, New York, 1964, Pages 415–421

It is apparent from a study of the foregoing data, particularly the potentials relative to aluminum, that the presence of manganese and chromium in the alpha phase particles can be expected to shift their electrode potential in the active direction compared to the potential which would occur if the alpha phase was predominantly iron rich. Also, the presence of dissolved copper in the aluminum solid solution may be expected to cause a shift in the matrix metal in the noble direction. The combined effect of lessening the nobility of the alpha phase particles by the presence of manganese and chromium and increasing the nobility of the surrounding solid solution by incorporating copper reduces the galvanic driving force between the alpha phase particles and the aluminum matrix metal and thereby reduces the pitting corrosion susceptibility of the core alloy.

The core material may also contain up to 0.5% zinc, up to 0.1% titanium, others each up to 0.05%, total up to 0.15%.

The cladding composition is an aluminum base alloy consisting essentially of from 0.05 to 0.2% bismuth, 4 to 14% silicon and the balance essentially aluminum. It is preferred to also include magnesium in the cladding material in an amount from 0.5 to 3%. The cladding material may also contain up to 0.8% iron, up to 0.5% copper, up to 0.3% manganese, up to 0.1% titanium, others up to 0.05% each, total up to 0.15%.

It has been observed that the intergranular corrosion of brazing alloy coated surfaces is associated with migration silicon-rich eutectic material from the brazing alloy material into the parent metal layer. Thus, for example, aluminum Alloy 3003 (an aluminum base alloy containing from 1.0 to 1.5% manganese, from 0.05 to 0.20% copper, up to 0.7% iron, up to 0.6% silicon, up to 0.1% zinc, balance essentially aluminum) clad with aluminum base alloy containing 10% silicon and 1% magnesium shows intergranular corrosion caused by a silicon-rich eutectic. Severe attack is found when the material is exposed to an intergranular corrosion test in both the brazing alloy and the parent metal at locations which contained particles of the silicon-rich eutectic material. It is believed that the intergranular corrosion process is caused by galvanic action between the more noble silicon-rich eutectic phase and the neighboring matrix alumina.

In accordance with the present invention it has been found possible to reduce or eliminate such intergranular corrosion by utilizing the composite of the present invention as described hereinabove. The composite of the present invention surprisingly provides galvanic protection against intergranular corrosion and results in a highly improved brazed aluminum composite.

The present invention and improvement resulting therefrom will be more readily apparent from a consideration of the following illustrative examples.

EXAMPLE I

A set of ingots were cast to the compositions shown in Table I below.

TABLE I

| Alloy | Percentage of Element | | | | | | | |
|---|---|---|---|---|---|---|---|---|
| | Cr | Bi | Si | Fe | Cu | Mn | Mg | Zn | Ti |
| A | 0.21 | — | 0.19 | 0.35 | 0.20 | 1.18 | — | 0.11 | 0.007 |
| B | — | 0.10 | 9.7 | 0.30 | 0.05 | 0.07 | 1.5 | — | 0.01 |
| C | — | — | 9.7 | 0.30 | 0.05 | 0.07 | 1.5 | — | 0.01 |

Ingot A was homogenized by heating to 600° F followed by heating from 600° F to 1125° F at 50° F per hour. The ingot was held at 1125° F for 8 hours and then cooled to 1025° F at 25° F per hour followed by cooling to ambient temperature in still air. Ingots B and C were homogenized by rapidly heating to 600° F followed by heating from 600° F at 1000° F at 50° F per hour. The ingots were held at 1000° F for 8 hours and then air cooled.

EXAMPLE II

The ingots obtained in Example I above was treated in the following manner. Ingots B and C were scalped on both sides leaving a 1.5 inch thick rectangular slab which was hot rolled to a gage of 0.148 inch using a 800° F entry temperature. Ingot A was also scalped to a 1.5 inch thick slab which was divided into equal portions. All materials were brushed and vapor degreased. Composites were then prepared as follows. One side Alloy B on Alloy A and one side Alloy C on Alloy A sandwiches were welded together on three sides. Both sandwiches were reheated to 800° F and hot rolled to reduce the thicknesses to 0.10 inch. This resulted in bonding together of the components of the sandwiches. The bonded sandwiches were then hot rolled using an entry temperature of 800° F. The resultant material was then cold rolled to a gage of 0.035 inch.

It is noted that the microstructure of Alloy A was characterized by a predominantly solid solution containing an alpha phase particulate dispersion uniformly dispersed throughout the matrix and particles of $MnAl_6$ at a lower density uniformly dispersed throughout the matrix, all as defined hereinabove.

The Alloy B on Alloy A and Alloy C on Alloy A composites were subjected to a simulated brazing process consisting of holding the materials for a total of 12 minutes in a vacuum furnace set at 1100° F while the pressure fell from $3 \times 10^{-5}$ to $1 \times 10^{-5}$ Torr. The specimens were then removed from the furnace and air cooled. Commercial control composites of the same gage of Alloy B on aluminum Alloy 3003 and Alloy C on aluminum Alloy 3003 were also subjected to the same simulated brazing process. The four samples were then evaluated for susceptibility to intergranular corrosion of the brazed materials.

Figure 2:
Figure 3:
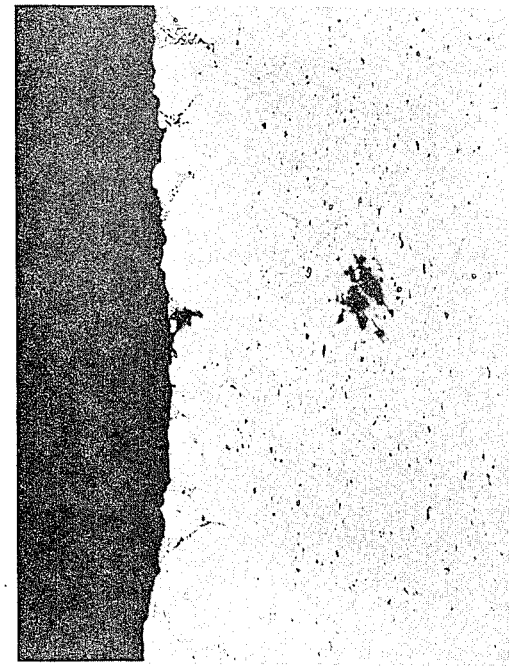
Figure 4:
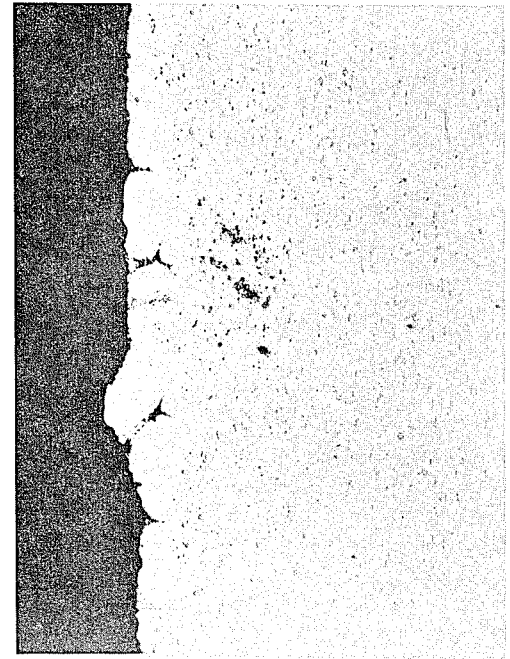

The four samples were immersed 24 hours in a boiling solution made by dissolving the following quantities of materials in 10 liters of distilled water:

1.48 grams $Na_2SO_4$
1.65 grams NaCl
1.40 grams $NaHCO_3$
0.29 grams $FeCl_3$
0.39 grams $CuSO_4 \cdot 7H_2O$ The specimens were allowed to remain in the solution for a further 24 hours during which it cooled to ambient temperature. The specimens were removed from the solution and examined for intergranular corrosion. The specimen surfaces were marked in some places by a white corrosion product which corresponded to intergranular corrosion. Metallographic cross sectioning of the specimens was carried out in the most extensive areas of the white corrosion products. Photographs at 200X magnification of the polished cross sections were made and are shown in the accompanying figures as follows:

FIG. 1 — Alloy B on Alloy A of the present invention.
FIG. 2 — Comparative Alloy C on Alloy A
FIG. 3 — Comparative Alloy B on aluminum Alloy 3003.
FIG. 4 — Comparative Alloy C on aluminum Alloy 3003.

The results clearly show that under the test conditions no intergranular corrosion was obtained involving the parent metal and the brazing alloy in the composite of the present invention, namely, in the case of Alloy B or Alloy A. In every other case intergranular corrosion of the parent metal occurred.

EXAMPLE III

A set of galvanic cells was set up by coupling the clad brazing alloys and core alloys described in Examples I and II above in the intergranular corrosion inducing solution described therein. In each case twelve square centimeters of the alloy surfaces were exposed to the solution. The remainder of the metal surface and a strip of metal connecting the twelve square centimeter areas were masked off. The specimen pairs were then connected externally with an eleven ohm electrical resistance by means of the metal strips. The electrical current flow in the resultant batteries was determined by measuring electrical potential drop across the eleven ohm resistance by a potentiometer recorder. The electrical currents were expressed as microamperes per square centimeter. The temperature of the solution was cycled from ambient temperature to the boiling temperature and back to ambient temperature and current density readings were plotted versus the solution temperature for each of the batteries.

The results are shown in FIGS. 5A, 5B, 5C and 5D. FIG. 5A represents the composite of the present invention, namely brazing Alloy B on parent Alloy A. The others are comparative samples. FIG. 5B represents brazing Alloy B on Aluminum Alloy 3003 parent, FIG. 5C is brazing Alloy C on parent Alloy A, and FIG. 5D is brazing Alloy C on aluminum Alloy 3003 parent. The results clearly show that the composition of the present invention, namely, brazing Alloy B on parent Alloy A results in galvanic protection of the parent metal A over the temperature range from 20° C to 70° C. In all other cases the brazing alloy is not galvanically protecting the parent metal in this temperature range. These data clearly show that the intergranular corrosion process in susceptible materials is promoted by the cathodic brazing alloy in contact with it. The only exception to this galvanic behavior is exhibited by the composition of the present invention in which the brazing alloy affords galvanic protection to the parent metal thereby preventing intergranular corrosion.

EXAMPLE IV

An automobile radiator may be fabricated by vacuum brazing an assembly of header tanks and fins which consist of Alloys B on Alloy A brazing sheet clad on both sides, and monolithic Alloy A tubes. The header tanks may also consist of Alloy B on Alloy A brazing sheet with the cladding B on the inside only. The preferred metal thicknesses are 0.050 inch for the tanks, 0.016 inch for the tubes, and 0.006 inch for the fins. The proportion of Alloy B to total brazing sheet thickness should be 4% for the tanks and 10% for the fins. The header tanks can be of unlimited thickness, but are usually no more than 0.050 inch thick. Tank thicknesses are determined by a compromise between the need to reduce overall weight of the radiator and the minimum pressure requirement for the radiator at the operating temperature which translates into a minimum bursting strength requirement. The cladding thickness relative to the total brazing sheet thickness is usually a function of the total sheet thickness and joining conditions. For example, for a brazing sheet having a total thickness of 0.024 inch or less, the cladding thickness may be 10% of the overall thickness. For sheets of 0.025 to 0.063 inch, the cladding thickness may be 8% of the composite thickness. For sheets 0.064 inch and above the cladding thickness may be 4% of the overall sheet thickness. Generally, the thickness of the brazing sheet will range from 0.001 to 0.1 inch with the cladding comprising from 2 to 15% thereof.

EXAMPLE V

A heat exchanger for liquefying oxygen may be fabricated by brazing an assembly consisting of parallel 0.032 inch gage sheets of parent Alloy A clad on both sides with the brazing Alloy B, with monolithic 0.008 inch gage Alloy A fins therebetween in a conventional manner. Alternatively, the brazing sheet may have a different core metal in which case the brazing Alloy B would be used as a filler metal. During the brazing process the brazing Alloy B would flow onto the Alloy A fins, providing the brazed aluminum composite of the present invention and resulting in the intergranular corrosion resistant Alloy B on Alloy A clad fins in accordance with the present invention.

The composite of the present invention is particularly useful in the manufacture of brazed equipment by mass production methods involving either flux or vacuum brazing. The composites of the present invention also have particular value for equipment which is expected to encounter corrosive conditions which could cause intergranular corrosion of the parent metal layers of conventional brazing sheets. Vacuum brazed aluminum heater cores have been found to have severe intergranular corrosion problems when made using conventional brazing sheets with Alloy 3003 parent metal. These heater cores are used, for example, to provide warm air to warm the passenger compartment of passenger cars by abstracting excess heat from the automotive engine coolant. The engine coolant passes through channels formed by parallel plates of brazing sheet which are brazed to the inlet and outlet header tanks of the heater core units. The intergranular corrosion results from contact between the corrosive aqueous engine coolant and the internal surface of the plate channels. The composite of the present invention significantly reduces the intergranular corrosion which occurs in this type of application. Other automotive applications exist for which the composite of the present invention is quite suitable, including automotive radiators and oil coolers in the engine systems, and also evaporators and condensers in automotive air conditioning systems.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A brazed aluminum composite having improved resistance to intergranular corrosion comprising a substantially magnesium free aluminum alloy core material consisting essentially of from 1 to 1.5% manganese, from 0.1 to 0.4% chromium, from 0.1 to 0.4% copper, from 0.01 to 0.6% silicon, from 0.01 to 0.7% iron, balance essentially aluminum, wherein the microstructure is characterized by a solid solution containing manganese, copper and chromium, an alpha phase particulate dispersion uniformly dispersed throughout the matrix containing manganese and iron, and particles of $MnAl_6$ uniformly dispersed throughout the matrix, clad with a brazing alloy consisting essentially of from 0.05 to 0.2% bismuth, from 4 to 14% silicon and the balance essentially aluminum, wherein said composite provides galvanic protection against intergranular corrosion and wherein said cladding cathodically protects the core over a temperature range from ambient to 70° C.

2. A composite according to claim 1 wherein said alpha phase particulate dispersion contains substantially comparable concentrations of manganese and iron.

3. A composite according to claim 1 wherein said core contains up to 0.5% zinc, up to 0.1% titanium, others up to 0.05% each, total up to 0.15%, and wherein said cladding contains up to 0.8% iron, up to 0.5% copper, up to 0.3% manganese, up to 0.1% titanium, others up to 0.05% each, total up to 0.15%.

4. A composite according to claim 1 wherein said cladding contains from 0.5 to 3% magnesium.

5. A brazed aluminum composite according to claim 1 wherein said cladding is on both sides of said core.

6. A composite according to claim 1 wherein said sheet has a thickness of from 0.001 to 0.1 inch and wherein said cladding is from 2 to 15% thereof.

* * * * *